April 21, 1964  B. A. BUSS  3,129,598

LAUNDRY MACHINES

Filed May 3, 1962

INVENTOR.
BENJAMIN ALVIN BUSS
BY
Robertson & Smythe
ATTORNEYS

United States Patent Office 3,129,598
Patented Apr. 21, 1964

3,129,598
LAUNDRY MACHINES
Benjamin Alvin Buss, East Moline, Ill., assignor to Ametek, Inc., East Moline, Ill., a corporation of Delaware
Filed May 3, 1962, Ser. No. 192,179
3 Claims. (Cl. 74—230.17)

The present invention relates to laundary machines, and particularly to a new and improved variable speed drive for washer-extractors.

The principal object of the invention is to provide a variable speed drive for the rotatable basket of a washer-extractor that will be easy to control from a cycle timer.

Another object of the invention is to provide such a variable speed transmission in which expansible pulley means is rendered effective to vary the speed of rotation of the rotatable basket by a flexible member that may be driven by an easily controlled motor means.

Still another object of the invention is to provide such a transmission in which expansible pulley means may be mounted on an oscillatable arm between driving and driven fixed diameter pulley means, and in which the expansible pulley means may include frictionally driven, intermediate disk means.

In one aspect of the invention, a frame may support a housing containing a cylinder or basket adapted to be rotated about a horizontal axis and to contain material to be laundered. The frame may also support a base for a variable speed transmission having a driven shaft that is belt-connected to a pulley on a shaft to which the basket or cylinder is fixed. A motor may be mounted on the base, and fixed diameter V-groove pulley means on the output shaft of the motor may be in position to cooperate with intermediate expansible pulley means. The expansible pulley means may be in position to cooperate with other fixed diameter pulley means on the driven shaft that is belt-connected to the pulley on the shaft supporting the cylinder or basket.

In another aspect of the invention, the intermediate expansible pulley means may be mounted on a shaft that is oscillatably mounted on the base supporting the motor and driven shaft. The oscillatable mounting may comprise an arm fixed to a pivot shaft at a predetermined angular position relative to another arm fixed to the pivot shaft, thereby providing a bell crank arrangement.

In still another aspect of the invention, a flexible member such as a chain or the like may extend between the outer ends of the arms forming the bell crank arrangement, and it may pass over a sprocket or the like fixed to the output shaft of a motor mounted on said base, which motor preferably may be of the so-called stall motor type.

In still another aspect of the invention, the intermediate expansible pulley means on the pivotally mounted arm forming part of the bell crank arrangement may include oppositely facing, conical disks fixed to a shaft journaled in a bearing at the outer end of said arm. Between said fixed, conical disks may be other oppositely facing, conical disk means, but so arranged that the latter form V-grooves with the fixed disks. These other conical disks may be fixed together, but freely rotatable and axially shiftable on the shaft supporting the first-mentioned conical disks.

In still another aspect of the invention, limit switch means may be provided for controlling the operation of the stall motor to provide the adjustment of the variable speed drive necessary to produce the desired speeds of rotation of the basket.

The above, other objects and novel features of the invention will become apparent from the following specification and accompanying drawing which is merely exemplary.

Figures 2, 3:
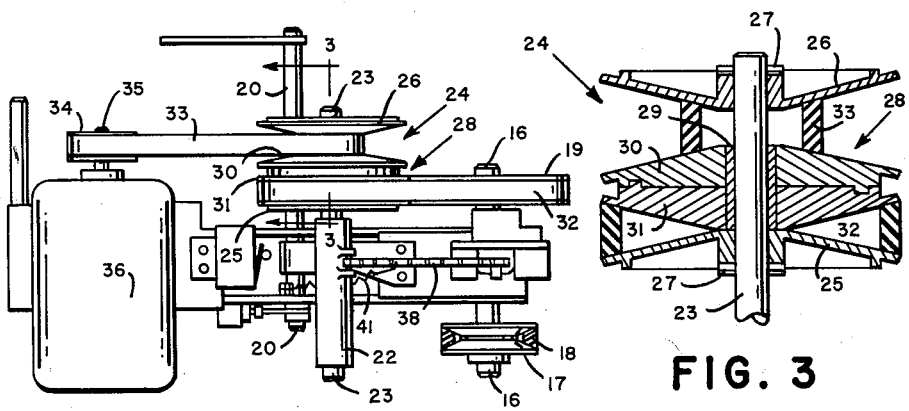
FIG. 2 is a plan view of the variable speed transmission of FIG. 1 as viewed by looking in the direction of the arrows along line 2—2 of FIG. 1.
FIG. 3 is a sectional view taken substantially along line 3—3 of FIG. 2.
Figure 1:
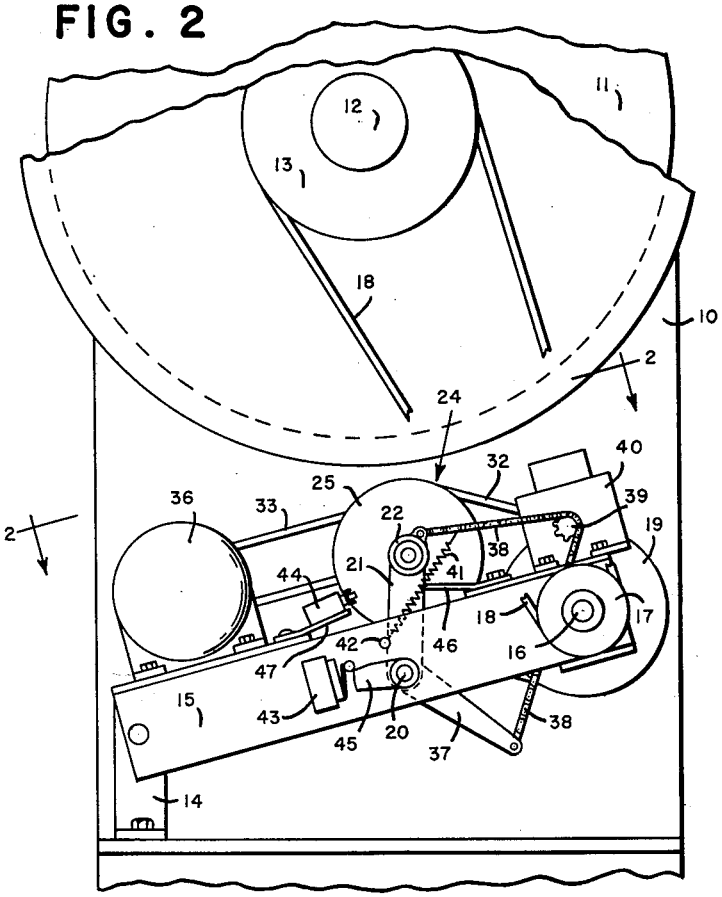
FIG. 1 is a rear elevational view of a laundry machine to which the principles of the invention have been applied.

Referring to the drawing, the principles of the invention are shown as applied to a laundry machine including a housing 10 within which a cylinder 11 may be mounted in fixed relation on a horizontally disposed shaft 12. The shaft 12 may extend to the exterior of the housing 10, and it may have fixed to its outer end, a V-groove pulley 13.

A bracket 14, fixed to housing 10, may support one end of a base 15, the other end being suitably attached to the housing 10. A shaft 16 may be suitably journaled in a bearing at one end of base 15. It may have a fixed diameter V-groove pulley 17 attached to one end, and a V-belt 18 may extend between pulleys 13 and 17. The opposite end of shaft 16 may have fixed to it a fixed diameter V-groove pulley 19.

A shaft 20 may be mounted for rotation within a bearing near the middle of base 15. An arm 21 may be fixed to shaft 20, and at its free end it may include a bearing 22. A shaft 23 may be journaled in bearing 22 and it may support expansible pulley means 24. Referring to FIG. 3, the expansible pulley means may comprise two oppositely facing, conical disks 25 and 26 that are attached to shaft 23 by pins 27. Between the two disks 25, 26 may be a double-faced conical disk means 28, pressed or otherwise secured to a bushing 29, so that the assembly is integral although it may be made from separate disks 30 and 31.

A V-belt 32 may extend between pulley 19 and disks 25, 31. Another V-belt 33 may extend between disks 26, 30 and a V-groove pulley 34 on the output shaft 35 of an electric motor 36.

With the parts in the condition shown, shaft 16 is rotating at its maximum speed. By turning the shaft 20 in a clockwise direction, the speed of shaft 16 is caused to decrease. In the present embodiment, oscillation of shaft 20 is accomplished by fixing an arm 37 to shaft 20 in a position relative to arm 21 to form therewith a bell crank arrangement. A flexible member 38, which in the embodiment disclosed is shown as a sprocket chain, has its opposite ends connected to the free ends of arms 21 and 37. The chain 38 is adapted to mesh with a sprocket 39 that is fixed to the output shaft of a motor 40 which, in the embodiment disclosed, is shown as a stall motor; that is, one that will produce a given torque beyond which it stalls with the current still applied, and without injuring the windings of the motor.

A spring 41 may have one end connected to the chain 38 and its other end anchored to the base 15 at 42, so as to provide a belt-tightening effect on the chain 38.

Limit switches 43 and 44 may be mounted on base 15 in position to cooperate with a lever 45, fixed to shaft 20, and with arm 21, respectively. Abutments 46 and 47 may also be mounted on base 15 to positively limit the extent of oscillation of the arm 21.

As previously indicated, with the parts in the position shown, the shaft 16 and the basket 11 are rotating at maximum extracting speed, with the motor 40 still energized but in stall condition. Also, limit switch 43 has been actuated which may have operated a time delay relay that will, after a predetermined period of extracting speed of basket 11, reverse the contacts for motor 40, causing it to reversely drive chain 38 and to move arm 21 in a counterclockwise direction. This reduces the speed of rotation of basket 11 until it drops to its lowest speed, whereupon limit switch 44 is actuated which may operate another time delay relay that, after a period of slow rotation of basket 11, may de-energize the motor 36 and motor 40. The main timer, of course, may be set to restart the apparatus, or it may be restarted by manual means.

Although the various features of the new and improved variable speed drive for a laundry machine have been described in detail to fully disclose one embodiment of the invention, it will be evident that changes may be made in such details and certain features may be used without others without departing from the principles of the invention.

What is claimed is:

1. In a laundry machine, a housing; a shaft journaled in said housing and supporting a basket for rotation within said housing, said shaft extending to the exterior of said housing; pulley means on the end of said shaft exteriorly of said housing; a base mounted in close proximity to said housing; motor means mounted at one end, and driven shaft means mounted at the other end of said base; lever means mounted on said base for oscillatable movement; a rotatable shaft mounted at one end of said lever means; oppositely facing, conical disk means fixed in spaced relation to said oscillatably mounted shaft; other oppositely facing, conical disk means journaled on said oscillatably mounted shaft between said fixed conical disks, providing therewith an oscillatable, expansible pulley means; belts connecting said motor means and said driven shaft means to said expansible pulley means; belt means connecting said driven shaft means to the pulley exteriorly of said housing; reversible stall motor means mounted on said base; and flexible band means having separate ends connected to said lever means and also connected to said stall motor means for oscillating said expansible pulley means.

2. In a laundry machine, a housing; a shaft journaled in said housing and supporting a basket for rotation within said housing, said shaft extending to the exterior of said housing; pulley means on the end of said shaft exteriorly of said housing; a base mounted in close proximity to said housing; motor means mounted at one end, and driven shaft means mounted at the other end of said base; a bell crank arrangement mounted on said base for oscillatable movement; expansible pulley means mounted at the free end of one of the arms of said bell crank arrangement; belts connecting said motor means and said driven shaft means to said expansible pulley means; belt means connecting said driven shaft means to the pulley exteriorly of said housing; a reversible motor driven sprocket mounted on said base; and a chain having separate ends connected to the free ends of the arms forming the bell crank arrangement, and meshing with said sprocket.

3. In a laundry machine, a housing; a shaft journaled in said housing and supporting a basket for rotation within said housing, said shaft extending to the exterior of said housing; pulley means on the end of said shaft exteriorly of said housing; a base mounted in close proximity to said housing; motor means mounted at one end, and driven shaft means mounted at the other end of said base; a bell crank arrangement mounted on said base for oscillatable movement; expansible pulley means mounted at the free end of one of the arms of said bell crank arrangement; belts connecting said motor means and said driven shaft means to said expansible pulley means; belt means connecting said driven shaft means to the pulley exteriorly of said housing; a reversible stall motor mounted on said base and having a sprocket connected to its output shaft; and a chain having separate ends connected to the free ends of the arms forming the bell crank arrangement, and meshing with said sprocket.

References Cited in the file of this patent

UNITED STATES PATENTS

| 2,920,493 | Pinder | Jan. 12, 1960 |
| 2,927,450 | Pool | Mar. 8, 1960 |
| 2,942,447 | Rickel et al. | June 28, 1960 |